United States Patent
Schroeder et al.

(10) Patent No.: US 9,038,991 B2
(45) Date of Patent: May 26, 2015

(54) MODULAR ELECTRONIC CARBONATOR FLUID LEVEL CONTROL MECHANISM

(71) Applicants: A. A. Judd Schroeder, San Antonio, TX (US); Albert Griego, Live Oak, TX (US); David Santy, Converse, TX (US); Jason Minica, Schertz, TX (US)

(72) Inventors: A. A. Judd Schroeder, San Antonio, TX (US); Albert Griego, Live Oak, TX (US); David Santy, Converse, TX (US); Jason Minica, Schertz, TX (US)

(73) Assignee: Schroeder Industries, Inc., San Antonio, TX (US)

( * ) Notice: Subject to any disclaimer, the term of this patent is extended or adjusted under 35 U.S.C. 154(b) by 435 days.

(21) Appl. No.: 13/655,815

(22) Filed: Oct. 19, 2012

(65) Prior Publication Data
US 2013/0099400 A1    Apr. 25, 2013

Related U.S. Application Data (60) Provisional application No. 61/548,878, filed on Oct. 19, 2011.

(51) Int. Cl.
| | | |
|---|---|---|
| *B01F 3/04* | (2006.01) | |
| *G05D 9/12* | (2006.01) | |
| *B67D 1/00* | (2006.01) | |
| *B67D 1/08* | (2006.01) | |
| *G01F 23/24* | (2006.01) | |

(52) U.S. Cl.
CPC ............. *G05D 9/12* (2013.01); *B67D 1/0057* (2013.01); *B67D 1/0871* (2013.01); *B67D 2210/00157* (2013.01); *G01F 23/242* (2013.01)

(58) Field of Classification Search
CPC ............ B67D 1/0871; B67D 1/0057; B67D 2210/00157; G05D 9/12; G01F 23/242
USPC ................. 261/72.1, 119.1, DIG. 7
See application file for complete search history.

(56) References Cited

U.S. PATENT DOCUMENTS

| | | | | |
|---|---|---|---|---|
| 4,028,441 | A * | 6/1977 | Richards | 261/36.1 |
| RE32,179 | E * | 6/1986 | Sedam et al. | 261/26 |
| 4,631,375 | A | 12/1986 | McCann | |
| 4,764,315 | A * | 8/1988 | Brusa | 261/140.1 |
| 4,804,112 | A * | 2/1989 | Jeans | 222/129.1 |
| 5,178,799 | A * | 1/1993 | Brown et al. | 261/39.1 |
| 6,148,681 | A | 11/2000 | Gravel et al. | |
| 6,394,311 | B2 | 5/2002 | McCann et al. | |
| 7,255,002 | B2 * | 8/2007 | Gravel et al. | 73/290 V |
| 7,698,940 | B2 * | 4/2010 | Osswald et al. | 73/304 C |
| 8,111,167 | B2 * | 2/2012 | Kopp | 340/614 |
| 8,528,882 | B2 * | 9/2013 | Pensa | 261/74 |

OTHER PUBLICATIONS

PCT International Search Report, Intl. App. No. PCT/US2012/060980, 10 pages Feb. 14, 2013.

* cited by examiner

*Primary Examiner* — Charles Bushey
(74) *Attorney, Agent, or Firm* — Jackson Walker LLP (57) ABSTRACT

A carbonator tank assembly is disclosed for use in a beverage machine wherein the beverage dispensed therefrom is a carbonated beverage. The carbonator tank includes walls defining a carbonator tank interior. A probe assembly is provided for coupling in a gaseous and fluid-type manner to the walls of the carbonator tank. The probe assembly has no floats but includes elongated probes having removed ends configured to extend into the interior of the carbonator tank and near ends exposed exteriorly. An electronics module is adapt to fluidly enclose an electronics assembly therein. The electronics module includes walls adapted to receive an electrical cable carrying electrical energy from a remote source.

18 Claims, 11 Drawing Sheets

MODULAR ELECTRONIC CARBONATOR FLUID LEVEL CONTROL MECHANISM

This application claims the benefit of and incorporates herein by reference, U.S. Provisional Application Ser. No. 61/548,878, filed Oct. 19, 2011.

FIELD OF THE INVENTION

Carbonators, more specifically, carbonator fluid level sensors and control mechanisms.

BACKGROUND OF THE INVENTION

Carbonators are known in the prior art to take plain water and carbonate it with pressurized $CO_2$. The soda water may be used for mixing with syrup in ways known in the art to provide a dispensed drink, such as Coca Cola, Dr Pepper, Pepsi Cola or the like.

Carbonators include $CO_2$ pressurized tanks engaged to a pump for pumping plain water thereinto. Electronic float control mechanisms may be used to turn the pump on and off responsive to the level of water in the tank of the carbonator. When the water gets low, a probe senses a low water condition and energizes the pump for providing water into the tank and, when the tank water level reaches a maximum, the electronic probe may sense the level and shut off the pump in ways known in the art.

SUMMARY OF THE INVENTION

Applicants provide an electronic mechanism, including probes and circuitry, for measuring the fluid level of soda water in a carbonator. Applicants separate elements of an electronic control assembly and provide for a modular electronics component having a housing and a base, which together removably engage a separate probe assembly, which probe assembly includes a multiplicity of probes for depending into the interior of the carbonator tank.

The probe assembly is fluidly and gaseously sealed against a mounting plate on the tank and is separate from a housing containing electronic elements of a fluid level sensor. Easy fastener engagement of the electronics module to the probe assembly is provided, such that the electronics module can be removed (for offsite testing, for example) from the probe assembly, which will remain on the pressurized carbonator. The structure of Applicants' carbonator tank assembly allows for maintaining pressure in the carbonator tank with the sensor elements engaged therewith while removing the electronic elements contained in a separate electronics module for offsite servicing.

Other than fasteners and the probe conductors themselves, the elements of the probe assembly are typically made of a hard, non-conductive, durable material and contain O-rings to fluidly and gaseously seal them from other elements of the carbonator tank assembly. Likewise, the electronics module is comprised of a hard durable, non-conductive material, excepting the fasteners and the electronic components thereof. O-rings and other fluid/gaseous sealing means are provided to fluidly seal the electronics module from the probe assembly, and from the probe assembly mounting plate.

By the structure of Applicants' multiple probes, it may accurately record fluid level at almost any carbonator tank tilt angle. Carbonator tanks are usually maintained upright, but may, on occasion, move to an out-of-normal angle and Applicants' probe provides generally accurate readings at such off-normal angles.

Applicants' probe avoids the need of moving parts as, for example, in prior art switch-type float probes. Moreover, Applicants' electronics module, in a fluid insulated sealed container, receives 110 volts or other high voltage AC source, and steps it down (and, in one embodiment, rectifies) before that source engages the probe assembly and the probes depending therefrom. Thus, there is no direct contact for high voltage AC between the electrodes and the fluid. The 110 volts is completely insulated and isolated from the carbonated water in the tank through the use of non-conductive materials, and the only conductive contacts with the tank water are low voltage DC or AC probe ends and through removable couplings from electronic module, contacts to probes of the probe assembly.

A carbonator tank assembly is disclosed for use in a beverage machine wherein the beverage dispensed therefrom is a carbonated beverage. The carbonator tank includes walls defining a carbonator tank interior. A probe assembly is provided for coupling in a gaseous and fluid-type manner to the walls of the carbonator tank. The probe assembly has no floats but includes elongated probes having removed ends configured to extend into the interior of the carbonator tank and near ends exposed exteriorly. An electronics module is adapt to fluidly enclose an electronics assembly therein. The electronics module includes walls adapted to receive an electrical cable carrying electrical energy from a remote source. Elements within the electronics module, such as integrated circuits, receive the electrical energy from the cable and provide it to electrodes extending from the walls of the electronics module. The electrodes and the electronics module are adapted to removably couple to the probe assembly such that the electrodes provide energy from the electronics assembly located in the interior of the electronics module and receive signals back from the probes and provide these signals to the electronics assembly. The signals are a function of an immersed/exposed condition of the removed ends of the probes, the immersed/exposed conditions reflecting an immersion or exposure to the fluid level in the carbonator tank of carbonated fluid. The signals received by the electronics assembly are sent to the pump and other elements of the dispensing assembly to control the pump so as to provide water to the carbonator tank responsive to a low-fluid signal.

BRIEF DESCRIPTION OF THE DRAWINGS

FIGS. 1 and 2 are cross-sectional views through the sections set forth in FIG. 1A above.

DETAILED DESCRIPTION OF THE PREFERRED EMBODIMENT

FIGS. 1-10 illustrate a carbonator tank assembly 10, including a carbonator tank 12 having a probe assembly mounting plate 70 welded (typically a filet weld) thereto. Probe assembly mounting plate 70 is adapted to receive a probe assembly 42 having a multiplicity of probes 50/52/54 (short, medium, long) thereon for depending into the interior of tank 12. Probe assembly 42 is adapted to be removably engaged to probe assembly mounting plate 70 in a fluid and gas sealing manner. Probe assembly mounting plate 70 engages tank top 12a by welds so as to be completely sealed to top 12a in a gaseous and fluid sealing manner. Adapted to be receivably and removably engaged to probe assembly 42 is an electronics module 16, which electronic module 16 includes a housing 22 removably engaged to a base 24.

Turning to FIGS. 1, 1A, 2, and 2A, it is seen that fluid level assembly 14 comprises electronics module 16 removably engaging probe assembly 42. Probe assembly 42 includes a base 43, which typically remains fixed by fasteners to probe assembly mounting plate 70. Electronics module 16 is removably attached to the base of probe assembly 42 with only fasteners and it may thus be seen that electronics module 16 can be removed from the probe assembly of carbonator tank assembly 10, so as to service the electronic portion of the carbonator tank assembly 10 without depressurizing the tank or removing the probe assembly 42. Probe assembly 42 removably seals to probe assembly mounting plate 70 and may stay engaged thereto.

Indeed, the modular nature of Applicant's carbonator tank assembly 10 may be appreciated with reference to FIGS. 1, 1A, 2, 2A, and 9. It is seen that a housing 22, typically for enclosing electronic elements, has an interior thereof. In one embodiment, mounted in the interior thereof is at least a first integrated circuit 18 and a second integrated circuit 20. The first integrated circuit is adapted to receive 110 volts AC from electrical cables 19 through a control connector clip 25. In one embodiment, first integrated circuit 18 functions, among other things, to rectify the AC and second integrated circuit 20 may step down DC voltage to the range of about 24 to about 12 volts. Thus, it is seen that, in one embodiment, probes 50/52/54 receive only low voltage DC through the electronics assembly contained within housing 22.

An electrical conductor cable 23 typically engages an upper portion of housing 22 through retainer nut 21, control cable 23 carrying one or more electrical wires 19 therethrough to engage the electronics within the housing, including the integrated circuits 18/20 thereof. Electronics, including integrated circuits 18/20 thereof, will provide low voltage AC or DC through contacts 32/34/36, which contacts may be spring loaded. These contacts, when electronics module 16 is nested and plugged into probe assembly 42 will contact in electrically coupled fashion the exposed near ends 50c/52c/54c (see FIG. 4) of probes 50/52/54.

It is to be understood that housing 22 engages base 24 (the two comprising the electronics module) in fluid sealing relation. Moreover, it is seen that base 24 provides electrical engagement for the removed ends of probes 50/52/54 through a water-tight engagement of elements 32/34/36 extending through the base. Moreover, an O-ring 21a is provided (see FIG. 3A) where control cable 23 usually carrying AC voltage extends through retainer nut 21. O-ring 21a is provided (see FIGS. 1 and 3A), where cable 23 passes through retainer nut 21 and into the interior of housing 22. It is seen that O-ring 21a provides fluid-tight sealing for both retainer nut/housing and cable/housing interfaces. Thus, it is seen that housing 22 and base 24 provide an electronics module 16 that is water-tight and is removable from probe assembly 42 with fasteners or other suitable means in a manner that does not require depressurization of the carbonator tank.

Figure 9:
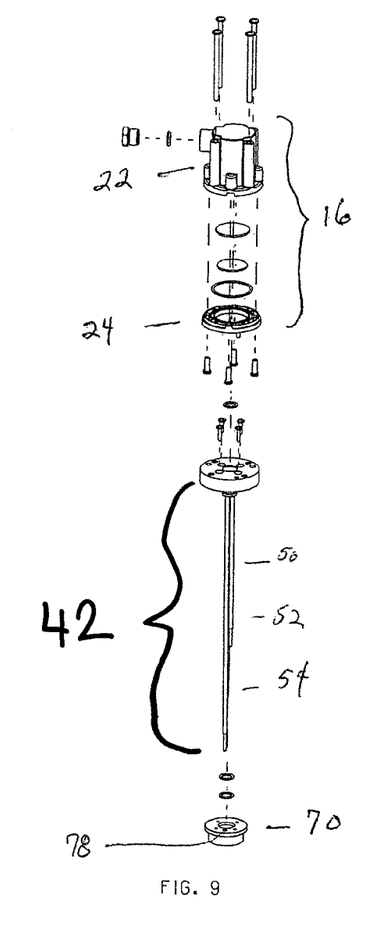
Figure 10:
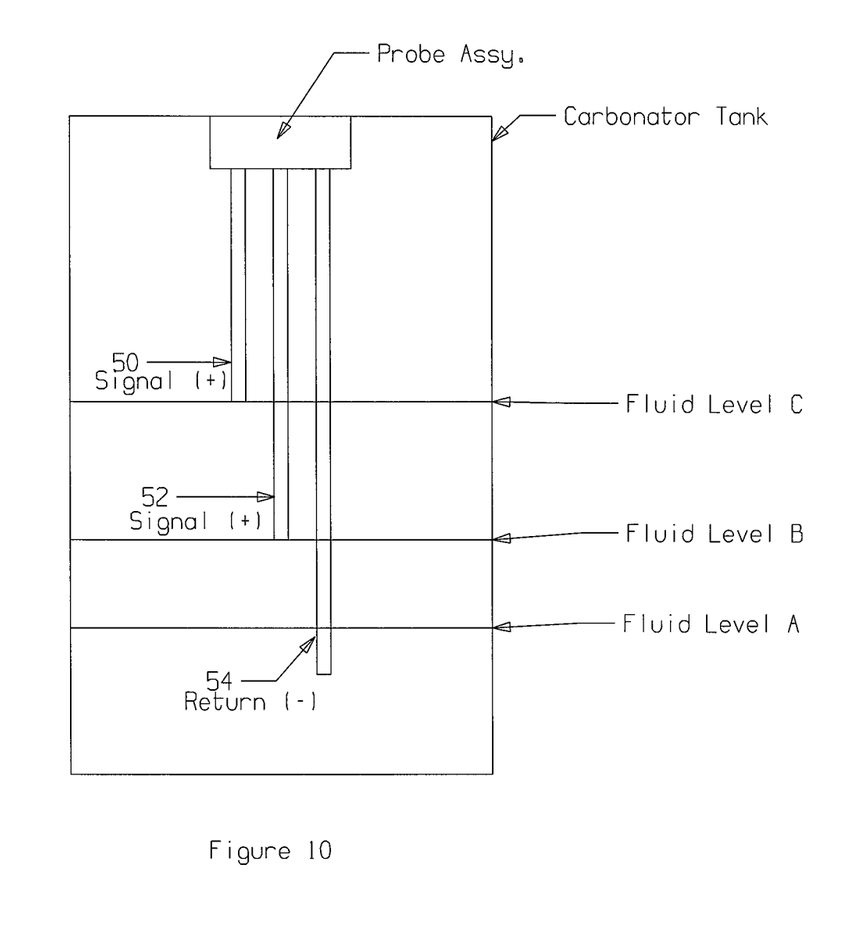
FIG. 10 illustrates in cross-sectional view, the various water levels as they interact with the probes.
Figure 11:
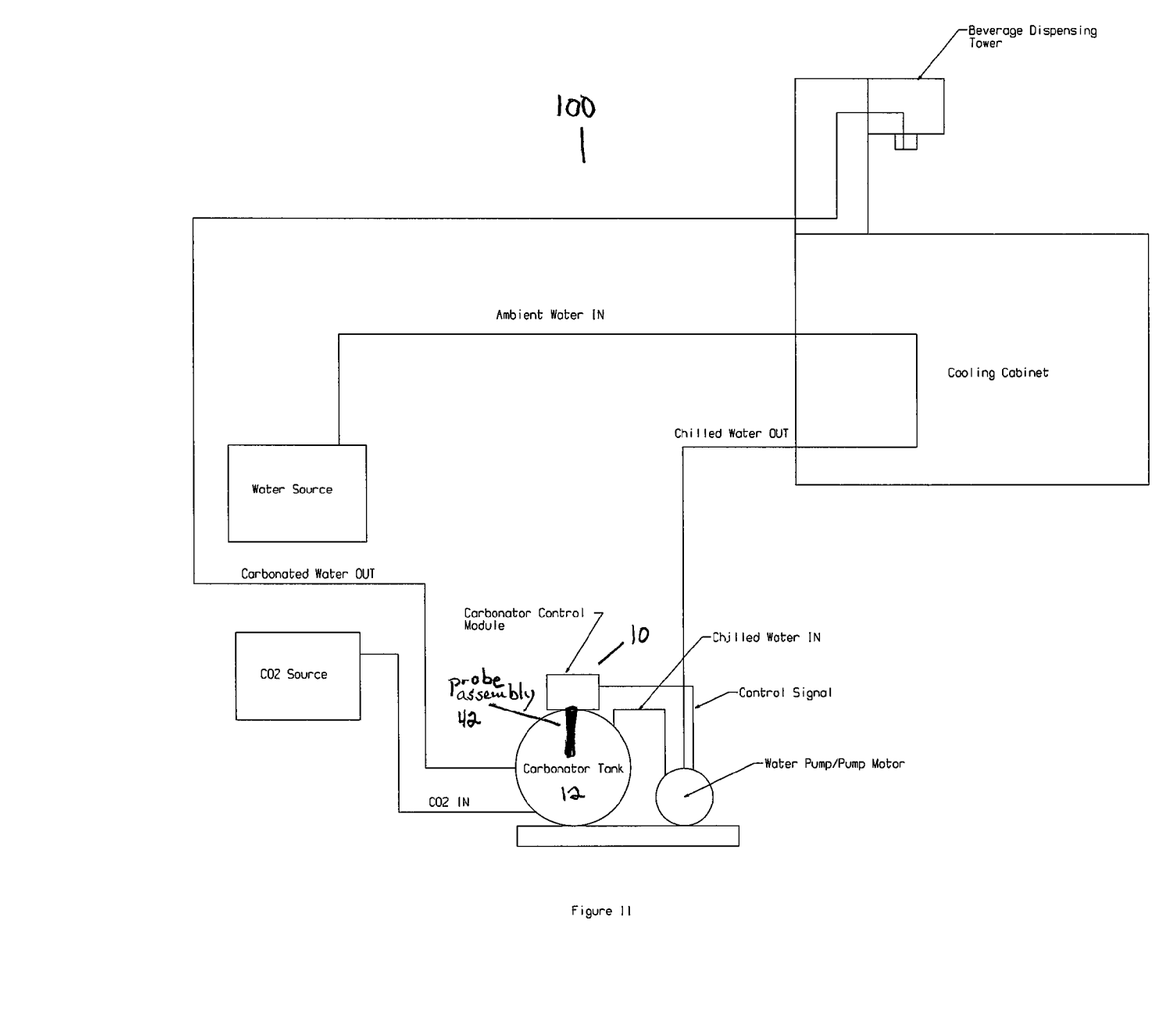
FIG. 11 illustrates the carbonator tank with a carbonator control module engaged therewith as part of a carbonated beverage dispensing system.

As seen in FIGS. 9, 10, and 11, probe assembly 42 acts as a water level control sensor and is arranged in the carbonator tank 12, such that, when carbonated water in carbonator tank 12 falls under a predetermined level b, it actuates a pump to supply water from water supply Water coming from water supply may be cooled by a cooling coil that is immersed in a cooling tank before it is fed into the carbonator tank 123. When carbonated water rises above level C, the pump will shut off.

Figures 1, 2, 2A:
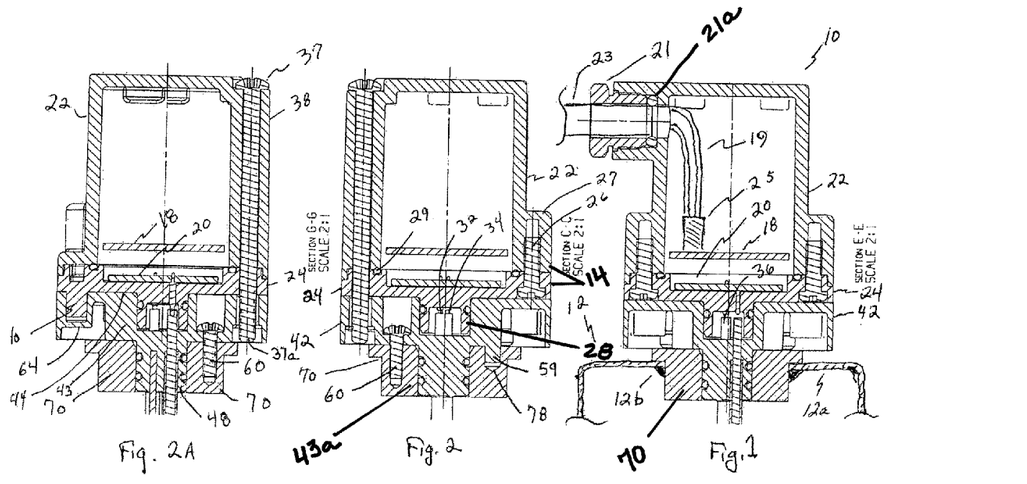
FIGS. 1, 2, and 2A are cross-sectional views of Applicant's carbonator level control mechanism 10 engaged to carbonator tank 12 through section E (FIG. 1) section C (FIG. 2), and section G (FIG. 2A).
Figure 1A:
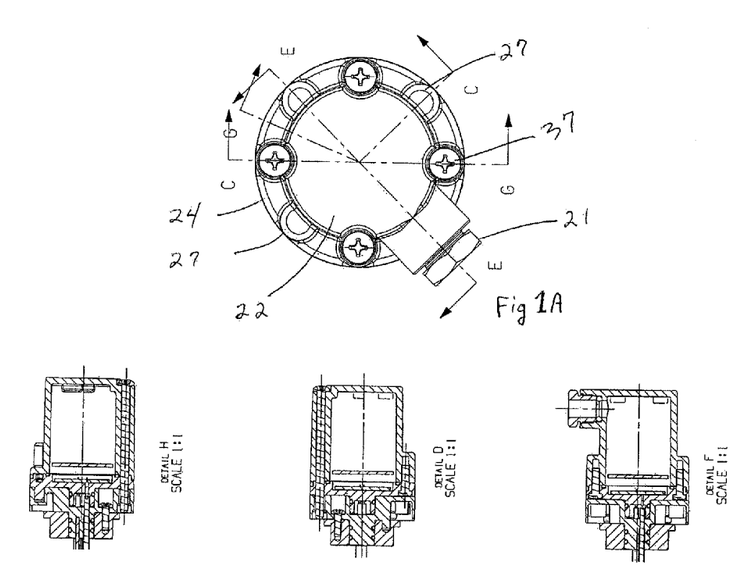
FIG. 1A is a top elevational view of the housing of the electronics module of the carbonator tank assembly.

Probe assembly 42 may include O-rings 43a which may engage extended member or arm 48 of base 43 as seen in FIG. 2 to fluidly seal against the side walls of probe assembly mounting plate 70. The near ends of the probes extend through base 43 in ways known in the art in a fluid and gaseous-tight seal so there is no leakage of fluid or gas either where base 43 engages probe assembly mounting plate 70 or where base 43 engages the probes extending through it. Thus, electronics module 16 itself removably couples with electronic connection to the removed ends of the probe, which probe assembly itself is fluidly sealed and gaseously sealed from the contents of the carbonator tank.

The three probe arrangement may be provided for sensing low fluid, high fluid, and return (see FIG. 10). However, other arrangements may be used. Here, electronics module 16 includes a base 24 removably attached to the housing 22 therethrough to a multiplicity, here, four, fasteners 26 on housing 22. Fasteners 26 engage the lower surface 24a of base 24 and engage threaded fastener shoulders 27 on housing 22 (see FIGS. 1 and 2). O-rings 29 are compressed as fasteners 26 thread into fastener shoulders 27 and pull base 234 against housing 22.

Attention now is drawn to base 24 of electronics module 16. More specifically, with reference to FIGS. 1,2, and 3, it is seen how base 24 includes plug 28 extending downward from lower surface 24a (reference FIG. 3) which will plug, in a fluid sealing manner with O-rings, into a cavity 46 in upper surface 44 of base 43 of probe assembly 42. Here, four elongated fasteners 37 are spaced around the exterior of housing 22 on shoulders 38. These electronics module-to-probe assembly fasteners 37 are seen to pass through holes 37b in base 24 so that removed ends 37a of fasteners 37 extend below lower surface 24a of base 24. These removed ends 37a thread into threaded recesses (four) 61 for receiving the removed ends 37a, so as to removably fasten the electronics module 16 to probe assembly 42. That is to say, removal of four easily accessible fasteners 37, when threaded out of engagement with threaded recesses 61, will allow one to unplug the frictionally held plug 28 to cavity 46 engagement to separate the electronics module 16 from the tank 12 without affecting the position or engagement of the probes to the tank. Following such removal, if desired, base 24 can be threadably removed and retainer nut removed so electronics module 16 is easily sent away for service or testing.

Figure 3:
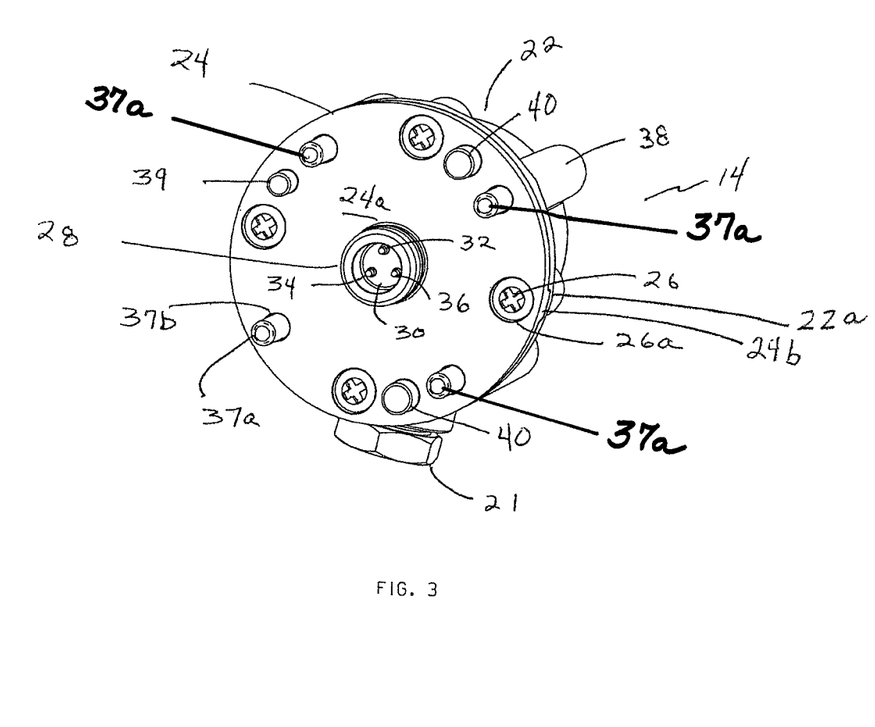
FIG. 3 illustrates a bottom perspective view of the electronics module 16 with a base 24 engaged to housing 22, the view illustrating most predominantly the bottom or lowest surface of the base.
Figure 3A:
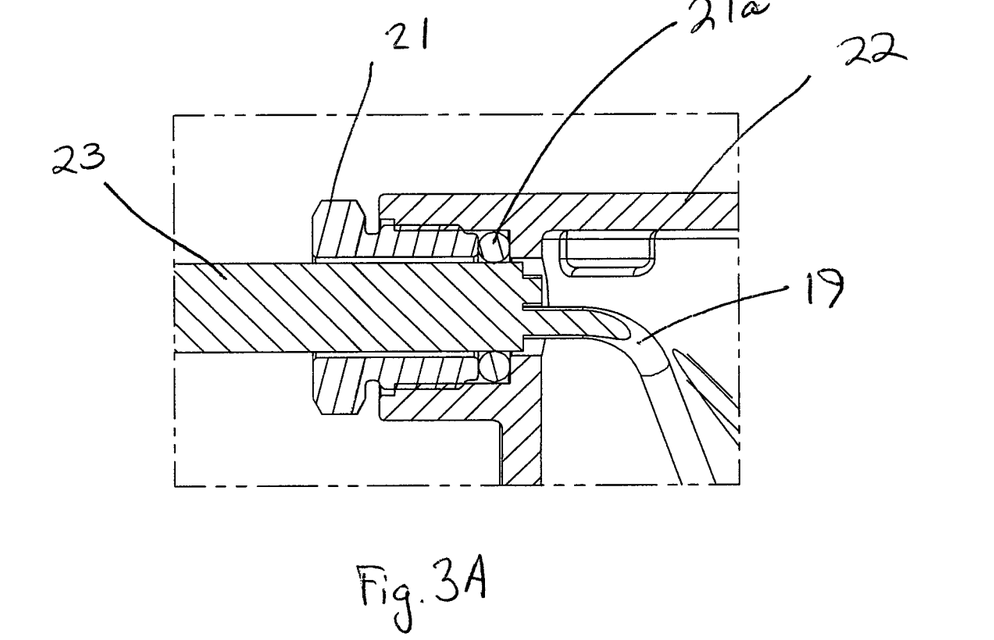
FIG. 3A is a detail cross-sectional view of the housing to cable connection.

Turning now to FIGS. 3, 4, 4A, 5, 5A, and 6, the details of the engagement of the base to the housing to comprise a fluid-tight electronics module and then the electronics module to the fluid and gaseously sealed probe assembly and the probe assembly to the probe mounting plate may be appreciated. It is seen with reference to FIG. 3 that lower surface 24a of base 24 is seen to have a small alignment pin 39 and two large alignment pins 40, which will allow only a one-way (rotationally speaking) engagement to the one small alignment hole 62 and the two large alignment holes 64 in the engagement of upper surface of base 43 of the probe assembly 42. This one-way alignment ensures that electronics module contacts 32/34/36 engage the correct exposed near end 50c/52c/54c of probes 50/52/54 (short, medium, long). FIG. 3 also shows the manner in which fastener recesses 26a allow for recessing the heads of fasteners 26, which fasteners, here four, will hold the module base 24 to the housing 22 as set forth above. Additionally, FIG. 3 illustrates how an alignment tab 24b pointing upward from the top of base 24 removably engages a cutout 22a in the lower perimeter of the housing to allow one-way (rotationally speaking) alignment of base 24 to housing 22.

Turning back again to FIG. 3, four holes 37b are seen to allow removed ends 37a of fasteners 37 to pass through base 22 so they may removably engage the four threaded recesses 61 in the base 43 of probe assembly 42.

Figure 4:
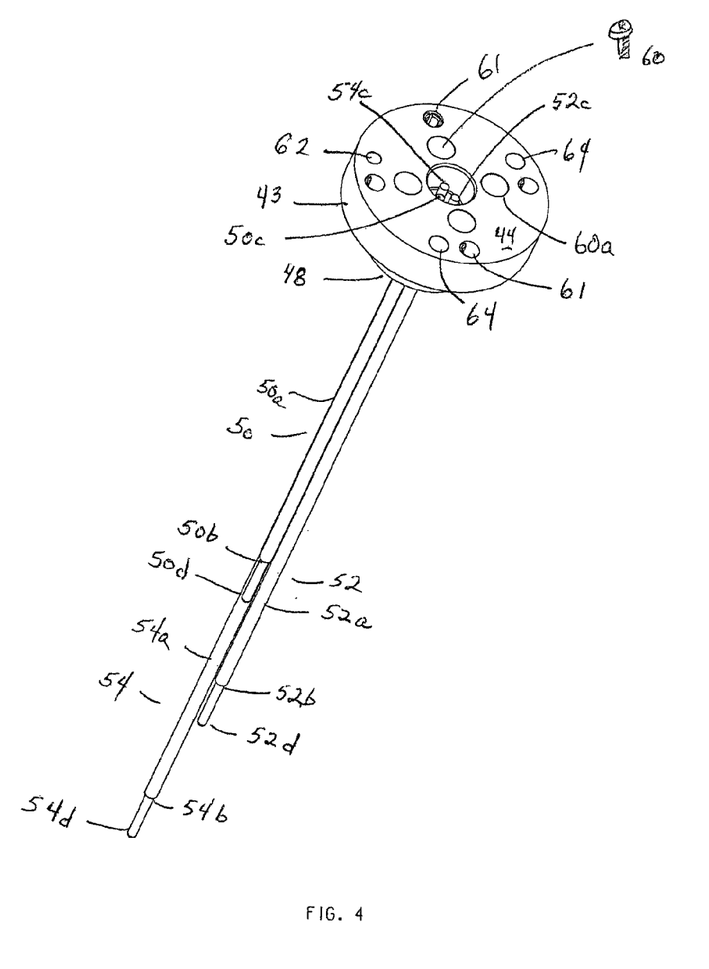
FIG. 4 is a top perspective view of the probe assembly of Applicant's carbonator level control mechanism illustrating most prominently an upper surface of the base thereof.
Figure 5:
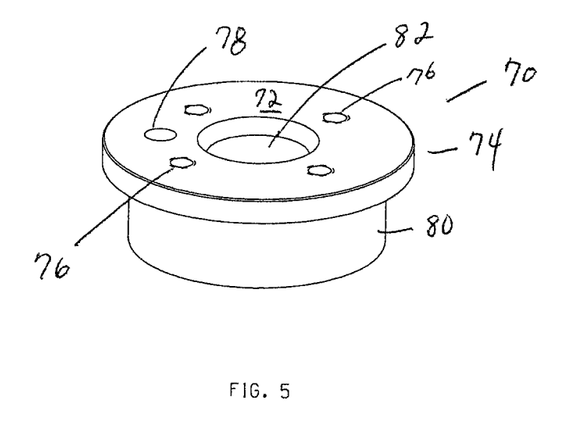
FIG. 5 illustrates a top perspective view of the probe assembly mounting plate.
Figure 6:
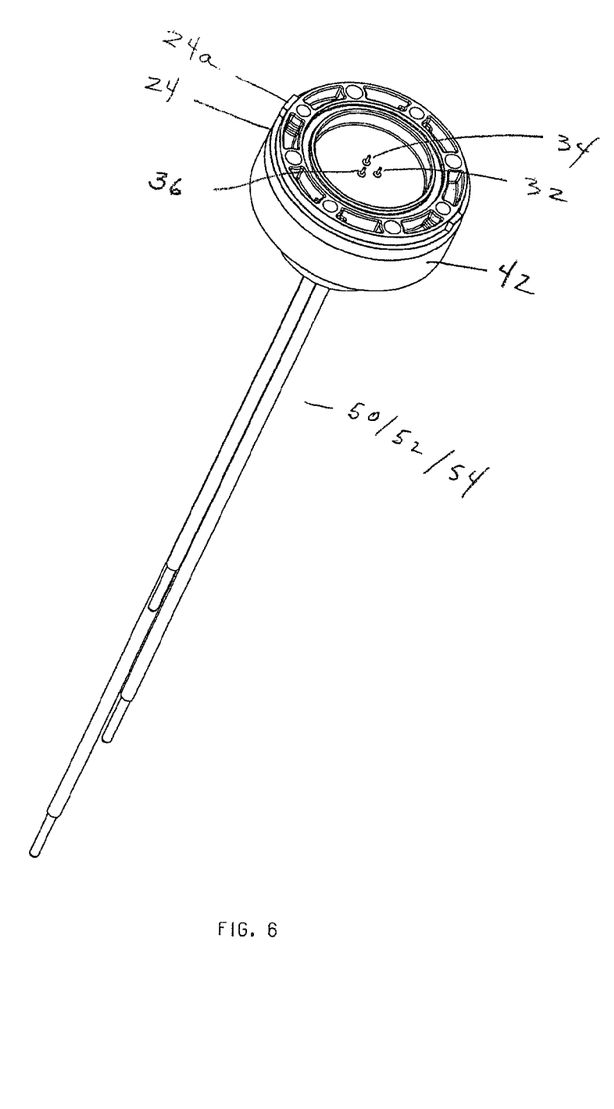
FIG. 6 illustrates a perspective top view of the assembly without the electronics module housing (showing the top surface of the base of the electronics module) and without the tank.

Turning to FIG. 4, elements, structure and function of probe assembly 42 may be appreciated. Probe assembly 42 includes a multiplicity, here three probes 50/52/54 (short, medium, long) molded integral (or by epoxy or other suitable sealing means) to and into near the upper ends thereof of an arm 48. Arm 48 is configured with O-rings 43a thereon to slide and fluidly seal into cylindrical channel 82 of probe assembly mounting plate 70. Fasteners (typically, four) 60 are provided here for removably engaging probe assembly 42 to probe assembly mounting plate 70. Fasteners 60 are received in recesses 60a, which recesses are in the upper surface 44 of base 43. Using recesses in the various elements, including the lower surface 24a of base 24 and upper surface 44, allow the surfaces of the bases to sit flush against each other as plug 28 removably and fluid sealingly engages cavity 46 of probe assembly 42 as best seen in FIGS. 1 and 2.

Figure 7:
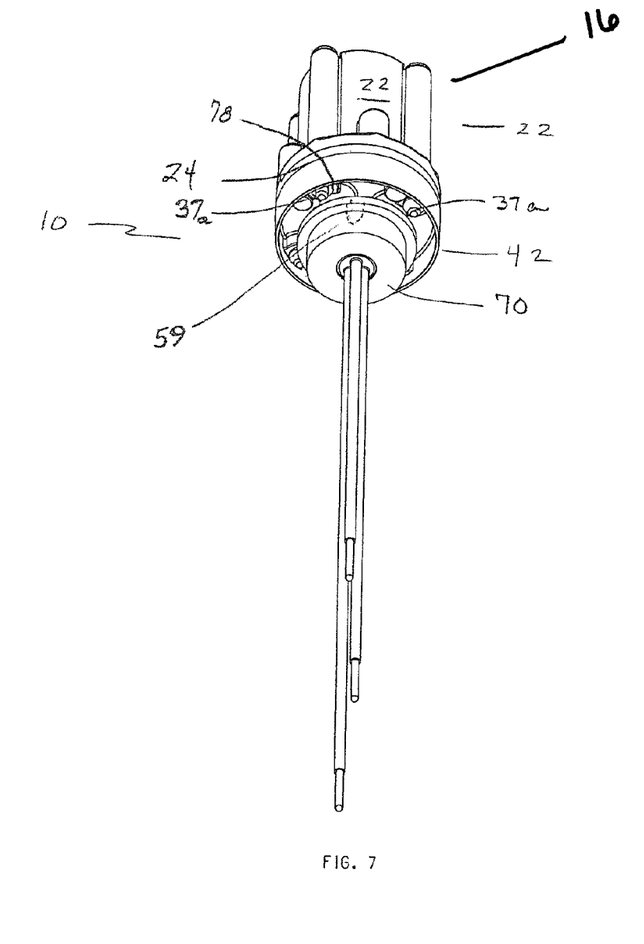
FIG. 7 illustrates the bottom perspective view of the probe assembly mounting plate.
Figure 8:
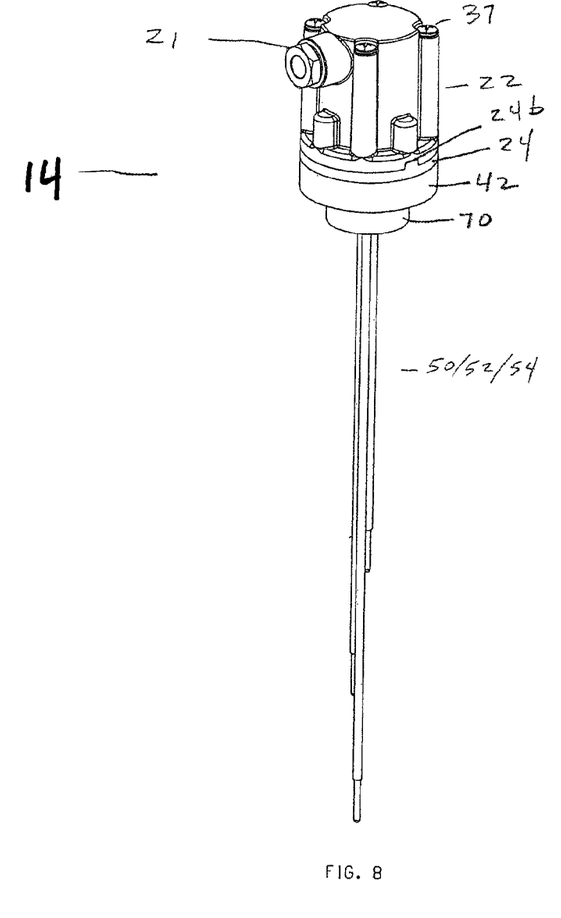
FIGS. 8 and 9 illustrate side perspective views of the assembly together and exploded, respectively.

The underside of probe assembly 42 as seen in FIG. 7 is seen to include an alignment pin 59 (ghosted in). Alignment pin 59 will allow the position of probe assembly 42 to be fixed with respect to the tank as alignment pin 59 will be received in alignment pin hole 78 of probe assembly mounting plate 70 (see FIGS. 2 and 9). Thus, the configuration or position of the near ends of the three probes will always be fixed both with respect to the tank and with respect to contacts 32/34/36. This is important as signals, such as conductivity of water, are analyzed in terms of the probes received therefrom to electrify or shut off the pump (not shown) so as to control the level of water in the carbonator tank. Upper surface 44 of base 43 is seen to have a cavity 46, which has cavity bottom wall 46a. Arm 48 extends below cavity bottom wall 46a and sealingly and moldingly and sealingly receives probes 50/52/54, such that no gas or fluid can leak between the probes and their engagement and molding in arm 48.

Probes include insulation sheaths 50a/52a/54a. Within the sheaths are conductors, 52b/52b/54b, such as stainless steel rods. The removed ends 50d/52d/54d are exposed so they may engage the fluid level and measure the fluid level of the water.

Turning now to FIGS. 2 and 5A, probe assembly mounting plate 70 is provided. It includes a base 74 having a top surface 72. Top surface 72 includes four threaded fasteners holes 76 for threadable receipt of removed ends of fastener 60 thereinto, so as to removably engage the probe assembly 42 to the probe assembly mounting plate 70. Dependent portion 80, which may be cylindrical, extends through cutout in the top 12a of tank 12 and a weld is provided as best seen in FIG. 1, the weld provided where the dependent portion 80 passes through the cutout 12b.

Turning to FIG. 10, it is seen that probe assembly 42 with probes 50/52/54 may sense several different fluid levels A, B, and C in the interior of tank 12. As set forth hereinabove, electronic elements within the electronic module will, in one embodiment, rectify AC to DC and step down the DC voltage, which stepped-down voltage may be applied, one polarity to probes 50/52 and the opposite to probe 54. In this condition, fluid at level C will prompt signals from 50/52 to return 54 and, through logic elements of the circuits, will detect "too high fluid" level and send a signal to shut off the water pump. Current flow from probes 52 to 54 will allow the pump to continue pumping, as seen at level B, for example. Dropping below the removed end of probe 52 will generate a no-current signal and prompt a signal to pump control elements (not shown) to generate water flow to the tank, thus maintaining fluid between B and C.

FIG. 11 shows the carbonator tank with Applicant's novel carbonator tank assembly 10 engaged therewith as part of a carbonated beverage dispensing system 100. The beverage dispensing system 100 may take any configuration that includes the need for carbonated water. In the configuration shown in FIG. 11, carbonator tank 12 receives high-pressure $CO_2$ from a high-pressure $CO_2$ source in ways known in the art. Carbonated water out may be provided to a beverage dispensing tower or in a bar gun or any other beverage dispensing device or head. Ambient water from a water source may be provided directly to the carbonator tank or, as shown, through a cooling cabinet that provides chilled water to a water pump/pump motor which in turn provides the chilled water in to the carbonator tank responsive to immersed/exposed condition of the removed ends of the probe of the probe assembly 42. A cooling cabinet may be provided for one or all elements of the assembly and the chilled water out from the water source may be chilled by means known in the art, including a cold plate.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:
1. A carbonator tank assembly comprising:
   a carbonator tank including walls defining a carbonator tank interior and a mounting plate;
   a probe assembly configured for removable gaseous and fluid-tight coupling using elastomeric members, to the mounting plate of the carbonator tank, the probe assembly without float elements, but including a multiplicity of elongated probes, each having a near end and a removed end, each probe having a different length, and a base, the multiplicity of probes fixedly and fluid sealingly engaging the base such that most of the probes length extends into the interior of the carbonator tank to different points when the probe assembly is engaged with the carbonator tank;

an electronics module adapted to receive electricity from a remote source through an electrical cable, the electronics module having an interior, the electrical cable engaging the walls of the electronics module in fluid sealing relation;

an electronics assembly configured to fit within the interior of the electronics module for receiving electrical energy from the cable and generating signals responsive to an immersed/exposed condition of the removed ends of the probes;

multiple electrodes for engaging the walls of the electronics module in fluid sealing relation and for engaging the electronics assembly, the multiple electrodes having removed ends adapted to form electrical engagement with the multiple near ends of the probes when the electronics module engages the probe assembly;

wherein the electronics module and probe assembly include coupling members to electronically and removably couple and uncouple the probe assembly to the electronics module, without affecting the gaseous and fluid tight coupling of the probe assembly with the tank.

2. The invention of claim 1, wherein the coupling members of the probe assembly and the electronics module include walls adapted to receive fasteners for removably fastening the probe assembly to the electronics module while leaving the probe assembly in removable, gaseous and fluid tight couple with the carbonator tank.

3. The invention of claim 1 wherein the electronics module includes a housing and a base, the housing removably coupled to the base in fluid sealing relation with fasteners.

4. The invention of claim 3 wherein the coupling members of the probe assembly and the electronics module include plug and socket members, which plug and socket members locate the removed ends of the electrodes.

5. The invention of claim 4 wherein the plug and socket members include an O-ring for fluidly sealing the plug to the socket.

6. The invention of claim 3 wherein the base and housing of the electronics module include walls to removably attach the base to the housing with fasteners and walls to removably attach the electronics module to the base of the probe assembly.

7. The invention of claim 3 wherein the base and housing of the electronics module are configured to receive sealing members to fluidly seal the surfaces therebetween and to fluidly seal the electronical cable where it enters joins the electronics module.

8. The invention of claim 1 wherein the probe assembly and the electronics module include walls adapted to align the two in a specific one-way alignment when they are engaged to one another.

9. The invention of claim 1 wherein the electronics assembly is configured to reduce voltage supplied thereto from the remote source, the reduced voltage for energizing the probes.

10. The invention of claim 9 wherein the remote source provides A/C to the electronics assembly.

11. The invention of claim 1 wherein the probe assembly includes a base, each with fastener walls configured to releasably engage one to the other with fasteners.

12. The invention of claim 11 wherein the mounting plate and base include walls configured to align one with the other in a specific one-way only position when they are engaged one to the other.

13. A carbonator tank assembly comprising:

a carbonator tank including walls defining a carbonator tank interior and a mounting plate;

a probe assembly configured for removable, gaseous and fluid-tight coupling using elastomeric members to the mounting plate of the carbonator tank, the probe assembly without float elements, but including a multiplicity of elongated probes, each having a near end and a removed end, each having a different length, and a base, the multiplicity of probes fixedly and fluid sealingly engaging the base such that most of the probes length extends into the interior of the carbonator tank to different points when the probe assembly is engaged with the carbonator tank and the near ends project through the base;

an electronics module adapted to receive electricity from a remote source through an electrical cable, the electronics module having an interior, the electrical cable engaging the walls in fluid sealing relation;

an electronics assembly configured to fit within the interior of the electronics module for receiving electrical energy from the cable and generating signals responsive to an immersed/exposed condition of the removed ends of the probes;

multiple electrodes for engaging the walls of the electronics module in fluid sealing relation and for engaging the electronics assembly, the multiple electrodes having removed ends adapted to form electrical engagement with the multiple near ends of the probes when the electronics module engages the probe assembly;

wherein the electronics module and probe assembly include coupling members to electronically and removably couple the probe assembly to the electronics module, without affecting the gaseous and fluid tight coupling of the probe assembly with the tank;

wherein the coupling members of the probe assembly and the electronics module include walls adapted to receive fasteners for removably fastening the probe assembly to the electronics module while leaving the probe assembly in removable, gaseous and fluid tight couple with the carbonator tank;

wherein the electronics module includes a housing and a base, the housing removably coupled to the base in fluid sealing relation with fasteners;

wherein the base and housing of the electronics module include walls to removably attach the base to the housing with fasteners and walls to removably attach the electronics module to the base of the probe assembly; and wherein the base and housing of the electronics module are configured to receive sealing members to fluidly seal the surfaces therebetween and to fluidly seal the electronical cable where it enters the electronics module.

14. A beverage dispensing apparatus comprising:

a water source;

a pump engaging the water source;

a source of high pressure $CO_2$ gas;

a dispensing head;

a source of beverage concentrate;

a carbonator tank assembly comprising:

a carbonator tank including walls defining a carbonator tank interior and a mounting plate;

a probe assembly configured for removable, gaseous and fluid-tight coupling using elastomeric members to the mounting plate of the carbonator tank, the probe assembly without float elements, but including a multiplicity of elongated probes, each having a near end and a removed end, each having a different length, and a base, the multiplicity of probes fixedly and fluid sealingly engaging the base such that most of the probes length extends into the interior of the carbonator tank to different points when the probe assembly is engaged with the carbonator tank and the near ends project through the base;

an electronics module adapted to receive electricity from a remote source through an electrical cable, the electronics module having an interior, the electrical cable engaging the walls in fluid sealing relation;

an electronics assembly configured to fit within the interior of the electronics module for receiving electrical energy from the cable and generating signals responsive to an immersed/exposed condition of the removed ends of the probes;

multiple electrodes for engaging the walls of the electronics module in fluid sealing relation and for engaging the electronics assembly, the multiple electrodes having removed ends adapted to form electrical engagement with the multiple near ends of the probes when the electronics module engages the probe assembly;

wherein the electronics module and probe assembly include coupling members to electronically and removably couple the probe assembly to the electronics module, without affecting the gaseous and fluid tight coupling of the probe assembly with the tank;

wherein the pump provides water to the carbonator tank responsive to signals from the electronics assembly; and wherein the source of high pressure $CO_2$ gas maintain pressure in the carbonator tank and wherein an outline from the carbonator tank to the dispensing head and lines from the beverage concentrate allows a carbonate of beverage to be dispensed therefrom.

15. The carbonator tank assembly of claim 2, wherein the electronics assembly provides low voltage DC to at least one of the probes.

16. The beverage dispensing apparatus of claim 14, wherein the electronics assembly provides low voltage DC to at least some of the probes.

17. The beverage dispensing apparatus of claim 14, wherein the coupling members of the probe assembly and the electronics module include walls adapted to receive fasteners for removably fastening the probe assembly to the electronics module while leaving the probe assembly in removable, gaseous and fluid tight couple with the carbonator tank.

18. The beverage dispensing apparatus of claim 14, wherein the probe assembly and the electronics module include walls adapted to align the two in a specific one-way alignment when they are engaged to one another.

* * * * *